United States Patent
Rey

[11] 3,789,625
[45] Feb. 5, 1974

[54] BISECTING PLANE ROTARY MOTION TRANSMISSION DEVICE

[76] Inventor: Andre Rene Rey, 93, Rue de la Curveillere, Albi, France

[22] Filed: Apr. 20, 1972

[21] Appl. No.: 245,874

[30] Foreign Application Priority Data
May 4, 1971  France .............................. 71.16717

[52] U.S. Cl. ................................... 64/21, 64/17 R
[51] Int. Cl. ............................................. F16d 3/30
[58] Field of Search ............................. 64/21, 18, 17

[56] References Cited
UNITED STATES PATENTS
| | | | |
|---|---|---|---|
| 3,456,458 | 7/1969 | Dixon | 64/21 |
| 1,899,170 | 2/1933 | Wainwright | 64/21 |
| 3,036,446 | 5/1962 | Morgenstern | 64/21 |
| 3,517,528 | 6/1970 | Eccher | 64/21 |

Primary Examiner—Charles J. Myhre
Assistant Examiner—Randall Heald
Attorney, Agent, or Firm—Young & Thompson

[57] ABSTRACT

This invention relates to a constant velocity universal joint including a drive shaft, a driven shaft and means interconnecting the shafts for relative swinging movement of the axes of said shafts from 0° to more than 90°. Said means comprising two semi circular forks, a yoke carried on the adjacent end of each of said shafts, a bevel gear carried by each shaft within said fork, a ring mounted for rotation about a diameter of said ring that coincides with the diameter of an articulation of said forks, and pinion gears mounted to rotate on said ring and mesh with said bevel gears.

1 Claim, 6 Drawing Figures

BISECTING PLANE ROTARY MOTION TRANSMISSION DEVICE

SUMMARY

The objective of the present invention is to construct a mechanical system for the transmission of rotary motion permitting the coupling of a driving shaft to a driven shaft with concurrent geometric axes and to obtain a speed of rotation for both shafts that is always equal, even when the angle formed by the geometric axes of the shafts varies from 0° to beyond 90°.

This objective is attained when the points connecting the two shafts are on the same plane which bisects the angle of their geometric axes and when the bisecting plane is the plane of symmetry of the system.

The two shafts are joined by: two yokes mounted on the end of each shaft and two forks sliding in the yokes. These forks are connected to each other on their merged diameters by articulated assembly.

The displacements of the parts in relation to one another are such that the geometric axes of the shafts form angles which are variable from 0° to beyond 90°.

A circular ring, which materialises the bisecting plane, is placed inside the forks and fixed to them by an articulated assembly in such a way as to bring its diameter into coincidence with the diameter of the forks.

On the inside of the ring, a cross turns, carrying two bevel wheels connected to the yokes and two other bevel pinions engaging with the first two.

The cross and bevel wheel assembly revolves freely inside the ring, and, through the equality of the wheel engagement sectors, this assembly takes a position such that it compels the ring to merge with the bisecting plane for all values of the angle of the geometric axes of the shafts.

The system is symmetrical in relation to the bisecting plane; the rotation speeds of the two shafts are equal.

DESCRIPTION

The present invention consists of a device for the transmission of rotary motion from a driving shaft to a driven shaft, of which the geometric axes are concurrent and form a variable angle.

There are various known types of devices for the transmission of rotary motion which comprise a driving shaft and a driven shaft with their ends fixed to either side of a flexible plate which, through its deformation, communicates the rotary motion from one shaft to the other when their geometric axes intersect forming a variable angle. These already known devices are little used and they lack precision. For example, the angle of the geometric axes of the two shafts varies from 0° to a maximum of approximately 15° and the rotation speed of the driven shaft varies in relation to the rotation speed of the driving shaft. In other known devices, the driving shaft and the driven shaft are connected to a cross made up of two integral and perpendicular arms.

However, these devices have several disadvantages, for example: the angle of the two geometric shaft axes varies from 0° to a maximum of approximately 40°. Moreover, if the driving shaft moves at a uniform rotation speed, the driven shaft moves at a rotation speed that varies periodically.

The present invention permits the avoidance of the disadvantages of the known devices while aiming at a rotary motion transmission device which communicates the rotary motion from a driving shaft to a driven shaft with concurrent axes and an angle varying from 0° to more than 90° without interrupting the rotary motion.

Another objective is a driven shaft that always moves at the same speed of rotation as the driving shaft.

The apparatus of the present invention comprises a driving shaft and a driven shaft with concurrent geometric axes and means at the end of each shaft designed to join the shafts at several connecting points and to place and maintain these connecting points on a plane that is both perpendicular to the plane of the geometric shaft axes and a bisector of the angle of these axes, in order to transmit the motion of one shaft to the other with equal speed of rotation for both shafts, while the angle of their geometric axes varies from 0° to beyond 90°.

In a realisation of the invention, these means are constituted by: two semicircular forks attached, on one hand, by articulated connections on their diameters at two points on the outside periphery of a ring such that the diameters of the forks coincide, and, on the other hand, connected by a sliding assembly along their semicircular arcs, each with a single yoke in an assembly of two yokes such that one is integral with the driving shaft and the other is integral with the driven shaft: two identical cylindrical spindles with concurrent and perpendicular geometric axes, forming a cross with four equal arms, the four ends of which are set to turn inside the ring. The said cross carries two identical bevel pinions turning on two opposing arms and, turning on the other two opposing arms, two bevel wheels which are and remain identical to each other, each carrying a cylindrical arm with geometric axis perpendicular to the wheel axis, with the said arm resting and turning in a bore that is integral with each yoke. The geometric axis of each cylindrical arm coincides with the axis of the bore on the yoke and the axis of the shaft corresponding to the yoke. This device is characterised by the fact that the geometric axis common to the plane of the driving and driven shafts and that the four bevel wheels engage with each other in such a way that the axis of the pinions that are not equipped with cylindrical arms is compelled to bisect the angle formed by the axes of the driving shaft and the driven shaft.

The following more complete and detailed description, as well as the appended figures to which it refers, as a non-restrictive example, shows all the characteristics and advantages of the present invention, which relates to a preferred but non-exclusive means of realisation of a bisecting plane rotary motion transmission device in conformity with the invention.

Figure 2:
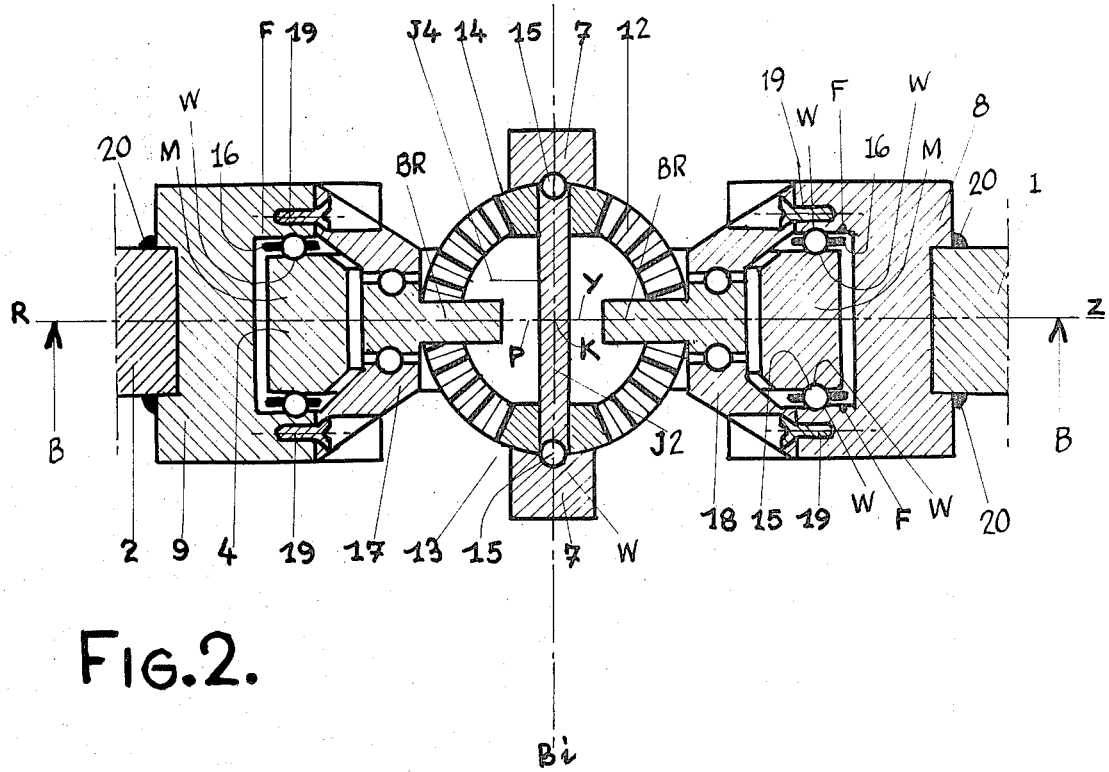
FIG. 2 is a sectional view of the device on a plane perpendicular to the plane of FIG. 1, which it cuts along AA.
Figure 3:
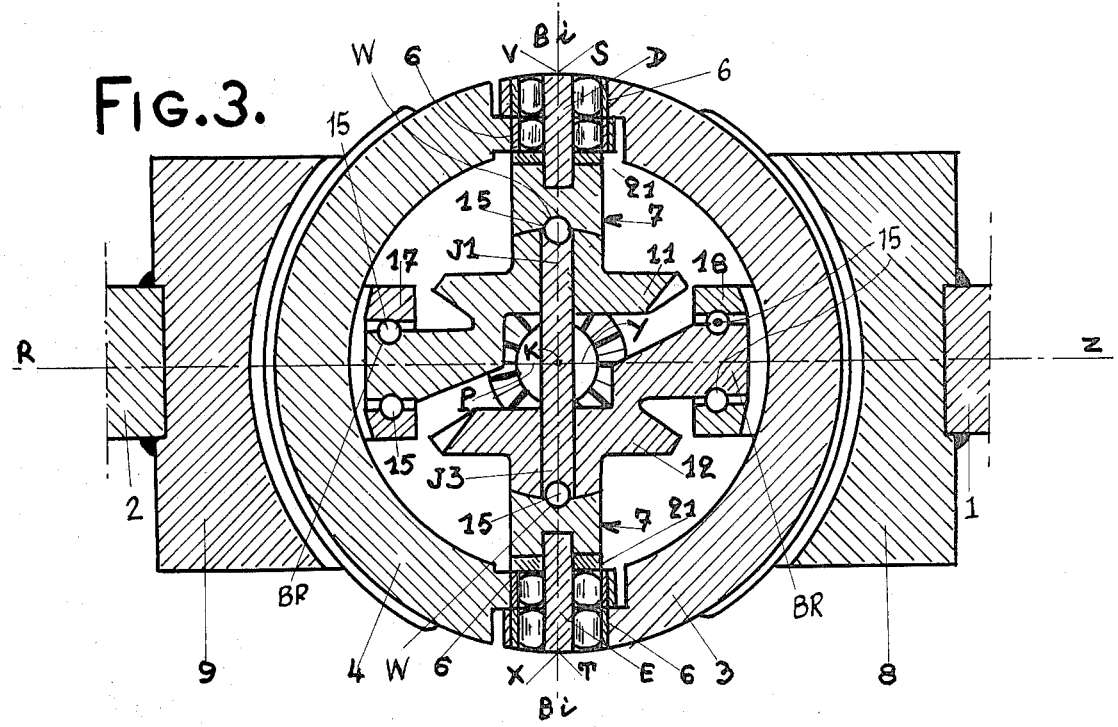
FIG. 3 is a sectional view of the device on a plane BB parallel to the plane of FIG. 1 and cutting the plane of FIG. 2 along BB.
Figure 4:
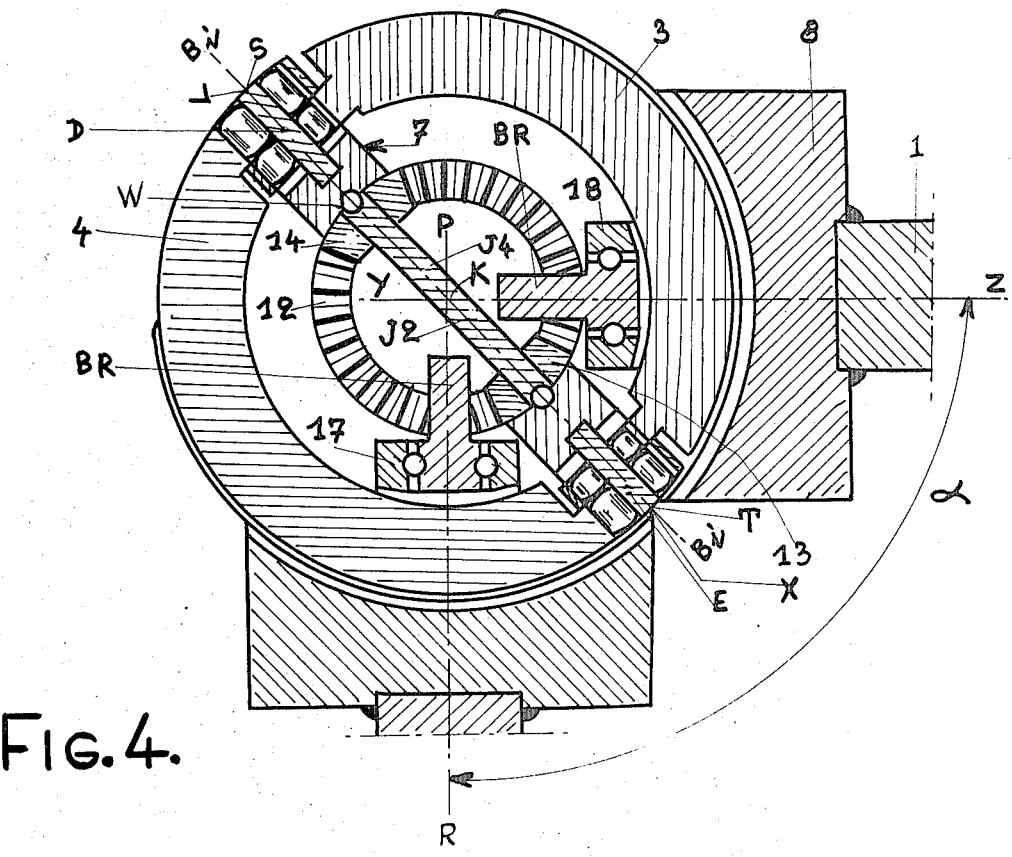
FIG. 4 is a sectional view of the device on the same plane AA as in FIG. 2, the system having made a quarter turn in relation to FIG. 1, with the driving and driven shafts forming angle $\alpha''$.
Figure 5:
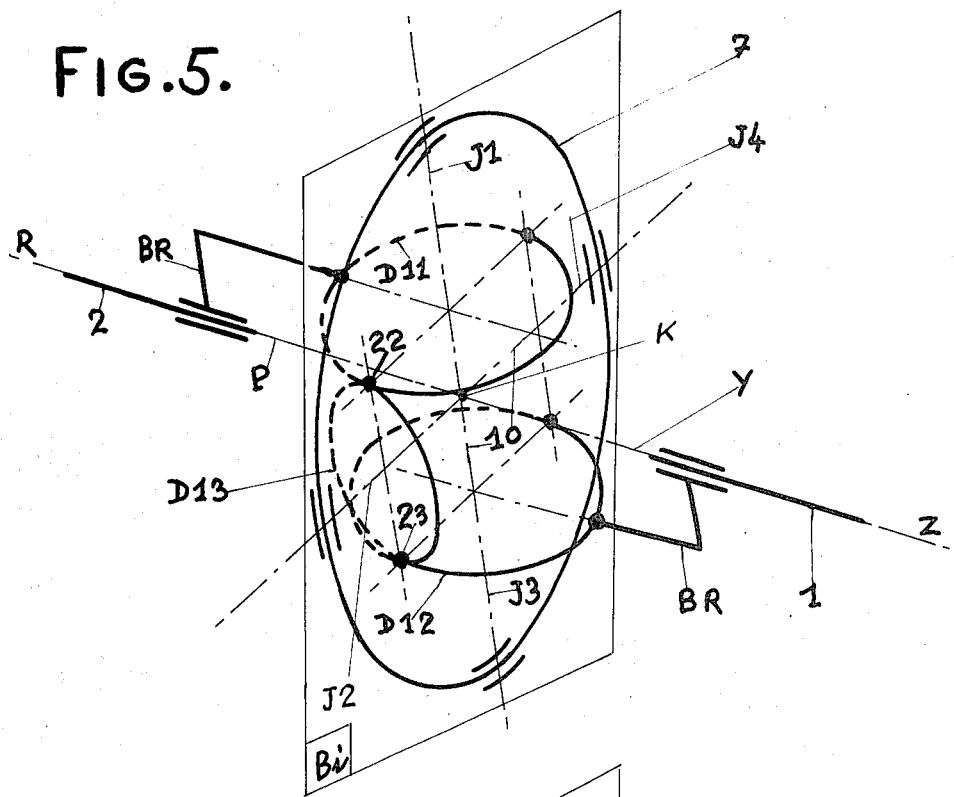
FIG. 5 is a partial diagrammatic view of the system for comprehension of its operation.
Figure 6:
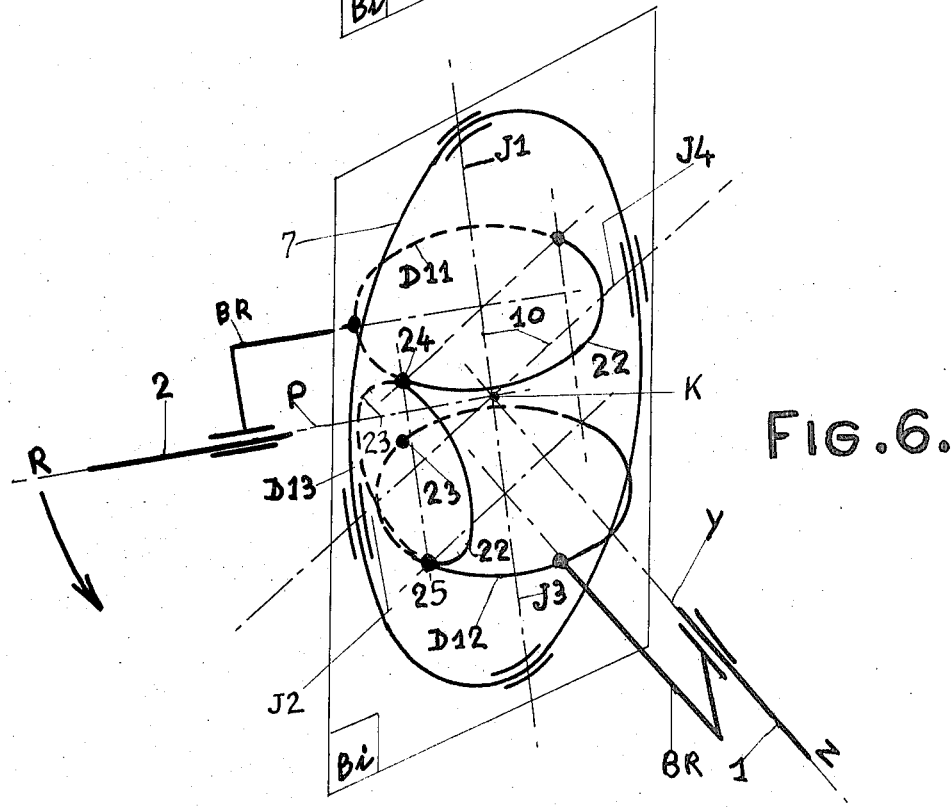
FIG. 6 is also a partial diagrammatic view of the system for comprehension of its operation.

A driving shaft 1 with geometric axis ZY and a driven shaft 2 with geometric axis RP, in extension of one another in FIGS. 1,2,3,5 and intersecting at 90° in FIGS. 4,6.

A yoke 8 integrally fixed to the shaft 1 -by a weld 20, for example — and a yoke 9 fixed to shaft 2, also by a weld 20. These yokes are identical, each possessing a similar plane of symmetry and axis of symmetry. The plane of symmetry of yoke 8 coincides with the plane of FIG. 1 and the axis of symmetry of this yoke 8 coincides with the geometric axis ZY of shaft 1. The plane of symmetry of yoke 9 coincides with the plane of FIG. 1 the axis of symmetry of this yoke 9 coincides with the axis RP of shaft 2.

In addition, the said yokes possess internal faces F FIGS. 2,3 parallel to their respective planes of symmetry.

A fork 3, semicircular (FIGS. 2,3) and with section M FIG. 2 in the form of a rectangle with two consecutive corners slightly beveled, axis ZY being the median of the long sides of the rectangle of section M. This fork possesses a plane of symmetry which contains its diameter ST and which is parallel to all its radii, while coinciding with the plane of FIG. 1. This diameter ST is perpendicular to axis RPYZ, which it intersects at point K, the middle of said diameter ST.

The undepicted radius of fork 3, originating at point K, the middle of ST, and coinciding with axis ZY, is the axis of symmetry of this fork 3.

Figure 1:
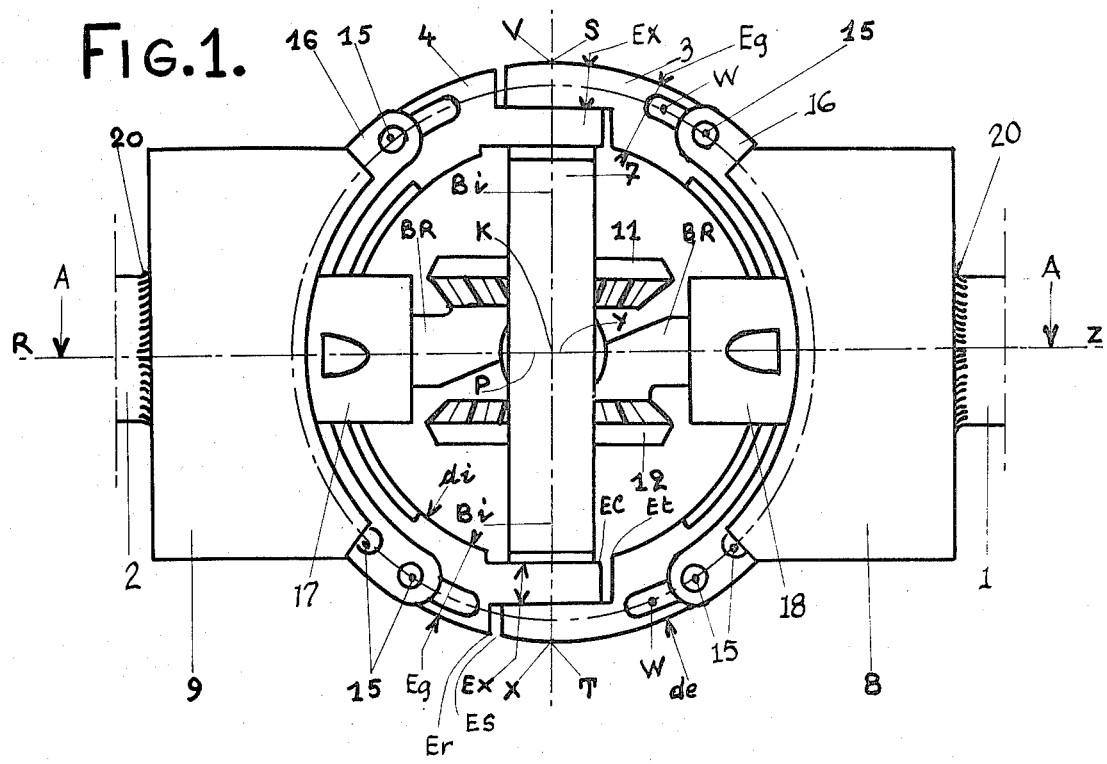
FIG. 1 is an elevation view of the device.

Another fork 4 (FIGS. 1,2,3,4) identical to the preceding also possesses a plane of symmetry which contains its diameter VX and which is parallel to all its radii, while coinciding with the plane of FIG. 1. This diameter VX is perpendicular to axis RPYZ, which it intersects at the above defined point K, the middle of diameter VX. The undepicted radius of fork 4, originating at point K and coinciding with geometric axis RP is the axis of symmetry of this fork 4. Fork 3 is equipped with two ball races W (FIGS. 1,2) grooved along the semicurlar profile of the fork on its parallel faces corresponding to the short sides of the rectangle of section M.

This fork 3 is assembled with yoke 8, which has ball races W grooved on its internal faces F identical to those on fork 3. The two parts are connected by balls 15 (FIG.3) mounted in a cage plate 16 (FIGS.1,2) which allows them to turn about their centres while preventing them from coming out of the races W.

In the same way that fork 3 is assembled with yoke 8 , fork 4 is assembled with yoke 9.

Fork 4 has two holes bored on its diameter V,X in order to receive a needle socket 6 assembled in each bore with no play FIGS. 1,3. In addition ,the extremities of the said fork 4 have thickness Ex equal to half their thickness Eg.

Similar to fork 4, fork 3 is bored to receive two needle sockets 6.

In addition, the extremities of this fork 3 have thickness Ex equal to half their thickness Eg.

Parts Ex of fork 4 are tangential to its inside diameter di. Parts Ex of fork 3 are tangential to its outside diameter (de).

The two forks 4 and 3 are in contact on faces F which are perpendicular to axes S,T and V,X.

Two pins D and E with outside diameters corresponding to the inside diameter of needle sockets 6, are mounted inside the said sockets,assembling forks 3 and 4.

Surface Et (FIGS.1,3) of fork 3 never comes into contact with surface Ec of fork 4; the same is true of surfaces Er of fork 4 and surfaces Es of fork 3.

After this assembly, diameter ST of fork 3 coincides with diameter VX of fork 4.

A circular ring 7 (FIGS.1,2,3,4,5,6) possessing a plane of symmetry Bi parallel to all these diameters and perpendicular to axis RPYZ which it intersects at point K, the centre of the diameters of the ring 7. This ring 7 receives ,on its outside periphery at the two ends of a diameter located on plane Bi, the two cylindrical connecting pins D, E, of which the geometric axes coincide with the said diameter, of the ring.

Fork 3 (FIG.3) is connected to ring 7 in such a way that the diameter ST of this fork coincides with the diameter of the ring that carries cylindrical pins D and E. Washers 21 interposed between the sockets and ring ensures an assembly with no play.

Similarly, fork 4 (FIG.2) is connected to ring 7 with its diameter VX coinciding with the diameter of the ring 7, which carries cylindrical pins D and E. This connection is also made by means of sockets 6 and washers 21.

A cross (10)(FIGS.5,6) is constituted by two equal cylindrical spindles joined in the middle in such a way that their geometric axes are perpendicular and they form four equal arms J1, J2, J3, J4.

The two geometric axes of the cross arms 10 are on the cross's plane of symmetry. This cross 10 is assembled inside ring 7 by means of four balls 15 (FIGS.2,3,4) placed, on the one hand,in four hemispherical cavities hollowed out of the end of each arm of the cross 10 and,on the other hand,in a ball race W grooved on the inside of the ring along its plane of symmetry.This assembly is realised in such a way that the planes of symmetry of the ring and the cross coincide.

A bevel wheel 11 (FIGS.1,3) possesses an arm BR with a cylindrical extremity, the geometric axis of this cylindrical extremity being perpendicular to the geometric axis of the bevel wheel 11.

On yoke 9 inside the semicircle of fork 4, a bracket 17 (FIGS. .2,3) is fixed by screws 19, for example. This bracket contains a bore with geometric axis coinciding with the geometric axis of yoke 9 and shaft 2.

The bevel wheel 11 is mounted on cross spindle J1, about which it can turn. The cylindrical arm BR on the bevel wheel 11 is assembled with yoke 9 by means of the bore in bracket 17, as arm BR is equipped with a ball race on a plane perpendicular to its geometric axis and the bracket bore is equipped with an identical ball race .Arm BR is therefore imprisoned in the bracket bore,within which it can turn. The geometric axes of cylindrical arm BR, the bore in bracket 17 yoke 9 and shaft 2 coincide.

A bevel wheel 12 (FIGS.1,2,3,4) identical to the preceding is mounted on cross spindle J3, about which it can turn. Bevel wheel 12 possesses a cylindrical arm BR identical to the above with geometric axis perpendicular to the axis of wheel 11. This arm is assembled with yoke 8 by means of a bracket 18 (FIGS.1,2,3,4) identical to bracket 17 and fixed to yoke 8 by screws 19. Balls hold cylindrical arm BR inside the bore in bracket 18. The geometric axes of arm Br, the bore in bracket 18, yoke 8 and shaft 1 coincide.

Wheels 11 and 12 have their teeth face to face, turned toward the centre of the cross and they are coaxial.

A bevel pinion 13 turns on cross spindle J2 (FIGS. 2,4) and a bevel pinion 14 turns on cross spindle J4. Their teeth are face to face, turned toward the inside of the cross. Wheel 11 engages with pinions 13 and 14 and wheel 12 engages with pinions 13 and 14.

A geometrical study of the system shows that the apparatus of the present invention operates in the following manner:

Initially and at rest, the geometric axes ZY and RP of shafts 1 and 2 merge in an extension of one another, the system being in the position defined by FIGS. 1,2,3 and 5 and the above description.

A torque applied to shaft 1 causes it to rotate about its geometric axis ZY. The yoke is driven by shaft 1. This yoke causes fork 3 to turn about axis ZY, while remaining immobile in relation to the yoke 8. Fork 3 causes ring 7 to rotate about axis ZY. The plane of symmetry of the ring containing two long diameters is compelled to remain perpendicular to axis ZY, since the axes of the cross spindles are themselves compelled to remain perpendicular to axis RPYZ because of the bevel wheels, which are perpendicular to axis RPYZ. The ring 7 causes fork 4 to rotate around axis RPYZ, communicating the rotary motion to yoke 9, which brings shaft 2 into rotation about axis RP. The assembly of cross 10 and bevel wheels 11, 12, 13, 14 is not put into motion, as it can turn freely and independently inside ring 7 and the brackets 17, 18 fixed to the yokes 9, 8.

The plane of symmetry of the ring Bi (FIGS. 1,2,3,5), which is perpendicular to axis RPYZ, is the bisector of the angle formed by the geometric axes of shafts 1 and 2. On this plane of symmetry, shafts 1 and 2 are joined at two connecting points located upon the geometric axes of pins D E, and the diameters ST and VX of forks 3, 4.

Since the system is symmetrical in relation to the plane of symmetry of the ring, the rotation speed of shaft 1 is equal to the rotation speed of shaft 2.

In a second operation, let us consider the system having made a quarter turn in relation to the initial position defined by FIGS. 1, 2, and 3, and the description FIG. 4 and 6, with no torque applied to shafts 1 and 2. Let us displace shaft 2 (FIGS. 4,6), while maintaining its geometric axis RP on the plane which contains it and which is perpendicular to the plane of FIG. 1, which it cuts along RPYZ, until axis RP forms an angle $\alpha$ of 90° with axis ZY. This is a non-restrictive example, as the angle $\alpha$ of the two axes RP and ZY can vary from the 0° to beyond 90°. Axes RP and ZY intersect at K.

As soon as axes RP of shaft 2 and ZY of shaft 1 form an angle other than 0°, axis ST (FIGS.1,3) of bevel wheels 11 and 12 and spindles J1 and J3 of the cross 10 places and maintains itself in a position perpendicular at K (FIG.6) to the plane of the axes RP ZY of shafts 1 and 2, since the axis of wheels 11 is on a plane perpendicular at K to the axis RP of shaft 2 and the axis of wheel 12 is on another plane which is also perpendicular at K to axis ZY of shaft 1. Since the axes of wheels 11 and 12 coincide, they are located at the intersection of the planes perpendicular at K to each axis RP, ZY, this intersection being the perpendicular at point K to the plane of the axes RP and ZY of shafts 2 and 1.

Consequently, the axis of pinions 13 and 14 is on the plane of the concurrent axes RP and ZY. The cross occupies a well determined position with its centre at K. The axis of spindles J1 and J3 is perpendicular to the plane of the two axes RP and ZY, the other geometric axis of spindles J2 and J4 being on the said plane RP, ZY. The above-mentioned displacement of shaft 2 provokes the rotation of bevel wheel 11 FIG.6 on its cross arm spindle J1. The other wheel 12, (FIGS.4,6) remains immobile on its spindle J3.

Pinions 13 whose axes are shown at (10), and 14 are put into motion by wheel 11 in such a way that if one considers FIG.6 the primitive diameters D11 D12 and D13 of wheels 11, 12 and 13, without representing pinion 14, pinion 13 engages with the same number of teeth or the same fraction thereof with wheel 11 and wheel 12.

The tangential points of circles D11, D12 and D13 being 22 and 23 when RP and ZY are in a straight line FIG.5, and 24 and 25 when RP is displaced (FIG.6): the lengths of arcs 22, 24 (FIG.6) of circle D13 and 22 24 of D11 and 25, 23 of D13 and 25 23 of D12 are equal.

Consequently, axis VX common to pinions 13 and 14 is on the plane of RP and ZY and bisects the angle $\alpha$ formed by these two geometric axes RP and ZY.

As the axis RP of shaft 2 is displaced on the plane which contains it and which is perpendicular to the plane of FIG. 1, which it cuts along RPYZ, yoke 9 slides on fork 4 (FIG.4), itself put into motion on plane RP, ZY by its diameter VX, which coincides with the axis of pinions 13 and 14. Fork 3 is driven by its diameter and slides in yoke 8.

The two connecting points of shafts 1 and 2, located on the geometric axes of pins D and E are on the same plane Bi that bisects the angle $\alpha$ of axes RP and ZY.

The system being in the position of FIG. 4, a torque is applied to shaft 1, causing it to turn about its axis ZY and drive yoke 8, which causes fork 3 to turn about axis ZY. The diameter ST of this fork being compelled to remain on plane Bi, it slides in yoke 8. The ring 7 is put into rotary motion in relation to its centre K. Fork 4 is driven by pins D and E. The diameter VX of fork 4 being compelled to remain on plane Bi, this fork slides on yoke 9 while rotating about geometric axis RP. The circular motion is transmitted to yoke 9 and shaft 2, which is driven in a rotary motion about its geometric axis RP.

The rotation speeds of driving shaft 1 and driven shaft 2 at an angle $\alpha$ of 90° are equal, the system being symmetrical in relation to plane Bi.

The description of the system and the study of its operation lead to the understanding that the angle $\alpha$ of the two geometric axes ZY and RP of driving shaft 1 and driven shaft 2 can have a lesser or greater value than 90°.

The device resulting from the present invention can be used for all cases in which the transmission of a rotary motion must be effected between two connected shafts forming variable and mobile angles in space and rotating at the same speed within the scope of general mechanics and construction of all devices using bevel gear flexible couplings and flexible shafts.

Particulary useful applications could be the fabrication of the transmission of drive and steering wheels on automobile vehicles on which the inside turning wheel displaces up to 90°.

As it is conceived, the invention may undergo numerous modifications and variations which are all included within the bounds of its inventive conception.

An element can be replaced by a technically equivalent element.

The dimensions and materials used for its implementation shall vary according to the requirements of each application.

I claim:

1. Apparatus for the transmission of rotary motion from a driving shaft to a driven shaft whose axes intersect, with equal speed of rotation when the angle between the axes varies from 0° to more than 90°, comprising means interconnecting the shafts for relative swinging movement of their axes from 0° to more than 90°, said means comprising two semi-circular forks disposed in the form of a complete circle and articulatedly interconnected about a diameter of that circle, a yoke carried on the adjacent end of each of said shafts, means mounting each said semi-circular fork for sliding movement in its plane in and relative to a said yoke, a shaft carried by each said yoke for rotation within said forks about an axis that coincides with the axis of the drive or driven shaft to which said yoke is secured, a bevel gear carried by each said shaft within said fork and having an axis perpendicular to the axis of the associated said drive or driven shaft, a ring disposed within and mounted for rotation about a diameter of said ring that coincides with said diameter of articulation of said forks, and pinion gears mounted for rotation on said ring and in mesh with said bevel gears.

* * * * *